Figure 1:
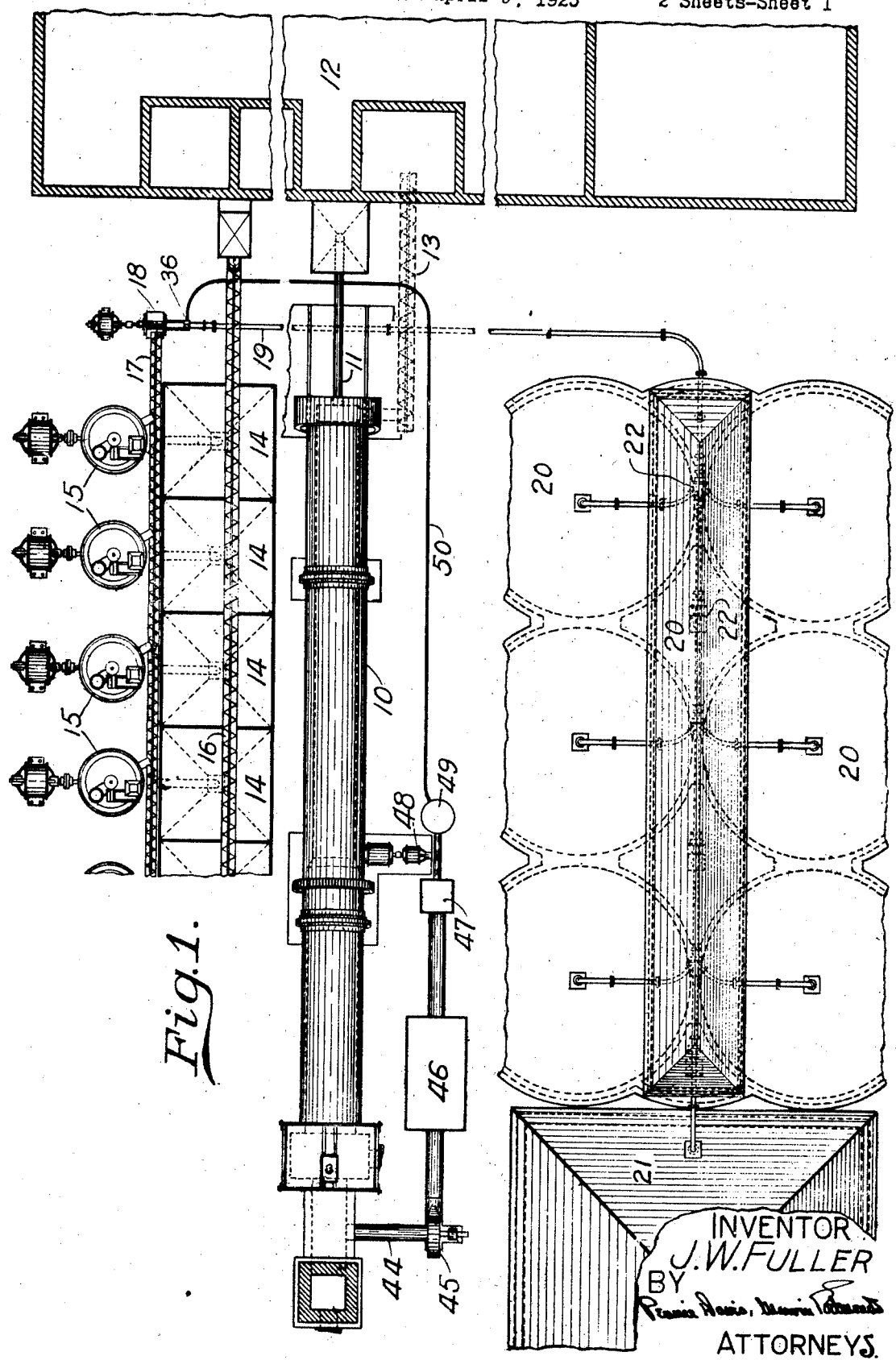

Nov. 30, 1926.

J. W. FULLER 1,608,499

PROCESS FOR AGING OR SEASONING CEMENT

Filed April 9, 1925     2 Sheets-Sheet 1

INVENTOR
J.W.FULLER
BY
ATTORNEYS.

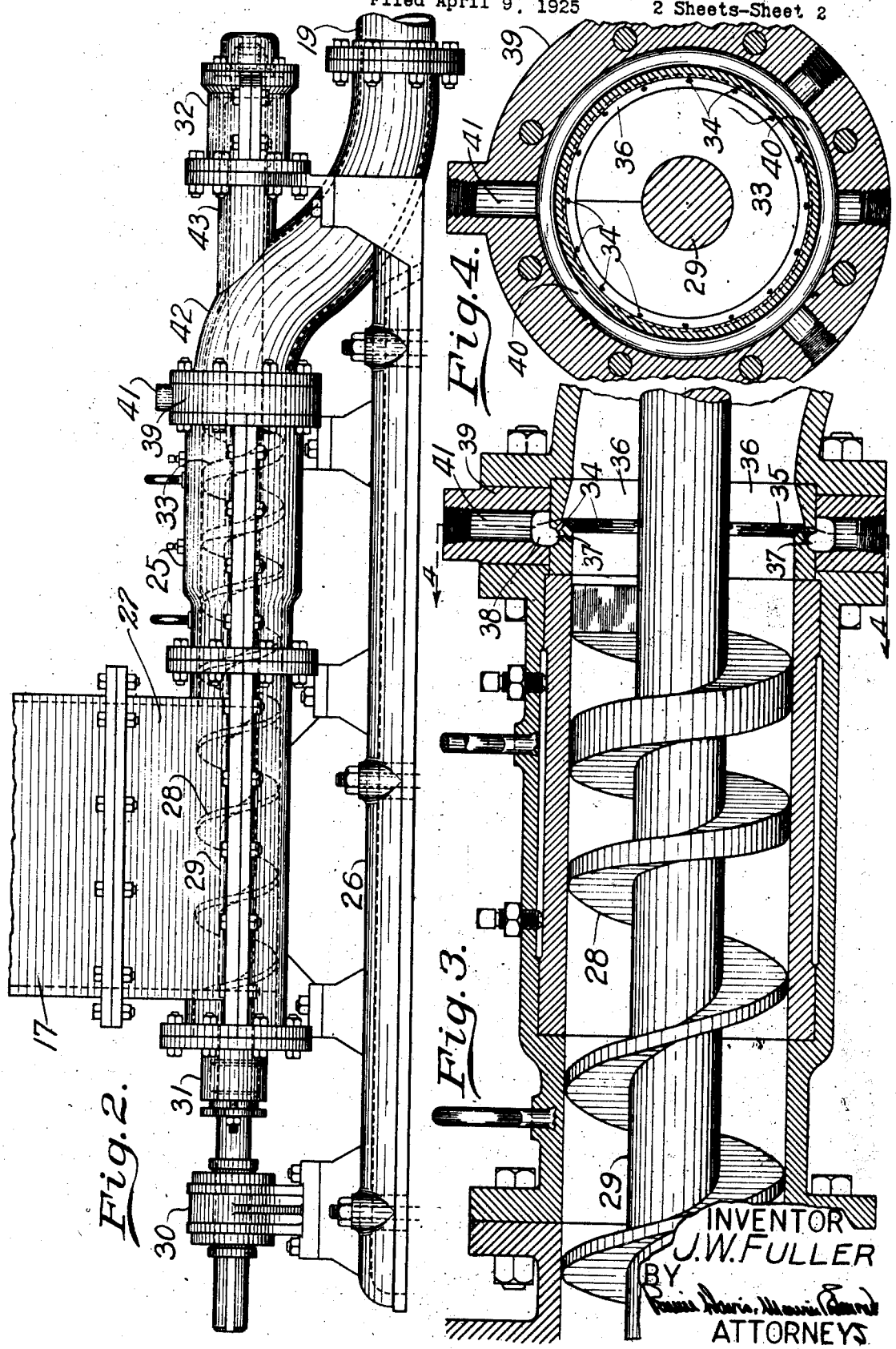

Patented Nov. 30, 1926.

1,608,499

UNITED STATES PATENT OFFICE.

JAMES WHEELER FULLER, OF CATASAUQUA, PENNSYLVANIA.

PROCESS FOR AGING OR SEASONING CEMENT.

Application filed April 9, 1925. Serial No. 21,950.

This invention relates to a process for aging or seasoning cement, and more particularly to a process in which the usual reactions of converting the free lime into the hydroxide and carbonate may be accelerated to such an extent that the cement may be used almost immediately after grinding.

Nearly all freshly ground cement contains a small amount of free lime in varying degrees. This is usually the cause of unsoundness and concrete made from such unsound cement becomes distorted, cracks and crumbles.

Cement which is unsound when made, may be seasoned by exposure to air, and this seasoned cement will be as good as if it had been sound when freshly made. Aging or seasoning cement consists in exposing the unsound cement to air, whereby, as air contains both moisture and carbon dioxide, the free lime will be converted into innocuous hydroxides, that is, the cement will absorb water and carbon dioxide to convert the free lime into calcium hydroxide and calcium carbonate.

Heretofore, the aging or seasoning of cement was accomplished by storing the same in bins or silos for periods of from three to six months. During this period, it is sometimes necessary to remove the cement from one bin to another in order to expose it to the air. The aging of cement by storage is expensive and in the active season results in hardships to the manufacturer.

According to my invention, the freshly ground unsound cement may be made sound almost immediately or without involving the usual long periods of delay. The finished cement is conveyed from the pulverizing mills to the hopper of a cement pump. The hopper discharges the cement into a hollow cylindrical barrel within which a differential screw rotates at high speed. The screw advances the cement toward the discharge end of the barrel and at the same time, due to the differential effect, compacts it, forming a zone of maximum density near the discharge end of the pump barrel. Into this zone of densely packed cement, and preferably just beyond the terminal flights of the screw, air or another gas under high pressure is injected through a multiplicity of orifices to break up the mass and thoroughly aerate the cement.

In its aerated condition, the cement is sluggishly fluent, and the thrust of the screw and the normal expansion of the injected gas are sufficient to carry the cement through a closed conduit for considerable distances to storage bins, packing houses or railroad cars. The volume and pressure of the gas may vary in accordance with several factors such as the length of the transport line, the moisture content of the cement, the elevation of the conduit, the degree of unsoundness of the cement, etc., but under usual conditions, the average proportions are one cubic foot of cement to ten cubic feet of gas, and the pressure may vary from thirty to one hundred pounds per square inch, or more.

This quantity of gas is considerably more than the theoretical amount necessary to convey and season the cement under ideal conditions, but is advisable to insure complete aeration of the rapidly advancing mass. Complete aeration results in the surrounding of a maximum of the particles of cement by a thin film of air or gas which insures the conversion of the free lime as the particles are transported through the pipe line.

Although the moisture and carbon dioxide in the air are sufficient to season the cement to a useful degree, I prefer to employ a mixed gas, the constituents of which are so proportioned that the reaction of converting the free lime may be substantially completed within the pipe line whereby the usual storage periods may be avoided or reduced to a minimum.

In order to obtain a mixed gas, high in carbon dioxide content, I may employ the waste gases of combustion from a cement kiln which are normally higher in carbon dioxide than the waste gases of a boiler furnace or the like, and which are readily available.

The waste gases from the kiln will vary in practice with respect to their constituents, and accordingly it may be desired to dilute the same with air and to add or subtract moisture from them as explained in detail hereinafter. The mixture need not be theoretically accurate as it is obviously advantageous to employ an excess of carbon dioxide to insure a complete reaction. The compressed gas is led to the cement pump through suitable piping.

Cement which has been correctly made will contain a relatively small amount of free lime which will be converted within the pipe line, but cements having an excess of free lime may be seasoned in part in the pipe line and the re-action completed in a receiving bin or silo with a minimum period of storage, as the aerated cement will retain the gas between the particles before the gas seeps out and the cement settles into the usual densely packed mass. In either event, the cement, treated in accordance with my process may be used almost immediately.

The actual percentage of free lime existing in the freshly ground cement is exceedingly difficult to determine and, accordingly, the most practical method of carrying out the reaction is to operate with an excess of carbon dioxide in the mixed gas and to control the moisture content to an extent that excess moisture will not condense in either the cement pump or in the transport line. The actual composition of the mixed gas can therefore be determined best by experiment in normal daily operation, that is, the carbon dioxide or the moisture content or both may be increased to a point at which the cement discharged from the pipe line will pass the "boil test" with the minimum storage time.

As the waste gases from a "dry process" kiln are ordinarily too dry to operate with best results, moisture may be added in any well known manner, such as by means of a steam or spray humidifier. On the other hand, the waste gases from a "wet process" kiln contain an excess of moisture, which can be removed by passing the gases through a cooler in which the excess moisture will condense.

By this method of carbonizing and hydrating free and uncombined lime, it is not necessary to burn Portland cement clinker as hard; this will result in the saving of coal and the kilns will turn out an increased tonnage. The softer burned clinker will grind much easier, with a corresponding reduction in horsepower and maintenance of the pulverizing equipment.

It is a well known fact that by carrying the lime content in Portland cement relatively high, the tensile and compressive strength will be greatly increased. Cement mills have not been able to increase the percentage of lime, however, for this purpose, without running the risk of unsound cement, as the other elements will combine only with a certain and definite percentage of the lime, and to increase the amount is likely to cause unsoundness because it leaves a certain percent of the lime uncombined and in caustic form.

The advantage of carrying the lime content relatively high can be obtained without danger by my method of hydrating and carbonizing, as it renders the lime neutral. Hydrated lime does not upset the soundness of cement, therefore, it is a further advantage of this invention, that it enables manufacturers to produce a cement greatly superior in compressive and tensile strength without producing an "unsound" cement.

In the accompanying drawings which illustrate a convenient layout of apparatus for performing my process:

Fig. 1 is a diagrammatic plan view of a cement plant showing the arrangement of apparatus for carrying out my process, Fig. 2 is a side elevation of a cement pump, Fig. 3 is an enlarged sectional elevation of the discharge end of the pump barrel showing the air ring, and Fig. 4 is a cross-sectional view of the air ring on line 4—4 of Fig. 3.

Referring particularly to Fig. 1, a conventional form of rotary cement kiln 10, is fired with pulverized coal, gas or oil by the usual blast piping and burner, 11. The burned clinker is carried from the hot end of the kiln to storage pits, 12, by a conveyor, 13, from which it is removed and carried to bins, 14, above the pulverizer mills, 15, by a conveyor, 16.

The mills, 15, discharge the freshly ground cement into a conveyor, 17, which in turn discharges into the hopper of a cement pump, 18, described in detail hereinafter. The pump transports the cement through a pipe line, 19, to any desired point, such as the silos, 20, or the pack and bag house, 21, suitable switching valves, 22, being provided to direct the cement to the desired terminal.

The cement pump comprises a cylindrical barrel, 25, mounted on a suitable base, 26. A receiving hopper, 27, discharges the cement into the barrel or short conduit, 25, wherein it is advanced by a differential conveyor screw, 28, mounted on a shaft, 29, which latter is supported in suitable bearings, 30, 31 and 32. In the embodiment shown in the accompanying drawings the differential effect is obtained by forming the screw with flights of continuously decreasing pitch from the end at which the material is supplied toward the terminal flights, 33, which are of increased thickness as compared to the remaining flights, both to increase the differential effect and to resist the abrasive action of the cement.

Accordingly, as the cement is advanced within the pump barrel or short conduit, 25, it is subjected to continuously increasing pressure to form a zone of high density near the end of the screw, the mass of cement in this zone forming a seal to resist a counterflow of gas, preventing the gas from flowing into the pump barrel or conduit, 25. Into this dense mass, gas for aeration is injected at high pressure through a multiplicity of apertures, 34, extending through the rear face of an annular recess, 35, formed in the air ring, 36. The gas is thus injected forwardly at an angle such that the mass of cement is thoroughly broken up and aerated, and the cement is conveyed through the pipe line, 19, by the thrust of the screw upon the cement and the normal expansion of the injected gas.

A groove, 37, formed in the outer surface of the air ring, 36, co-operates with a groove, 38, formed in the inner face of an outer ring, 39, to provide a continuous passage, 40, for the compressed gas which is admitted thereto through the port, 41, to which the gas is supplied as explained in detail hereinafter.

Secured to the ring, 39, is a curved conduit, 42, which deflects the advancing stream of cement downwardly around the shaft, 29, and terminates at its junction with the pipe line, 19, as shown in Fig. 2. A hollow tubular projection, 43, is formed in the conduit, 42, to surround the shaft and to aid in supporting the outer shaft bearing, 32.

Although air may be used as the gas described above to perform the reactions noted, it is only satisfactory in the event that the free lime content is low and the clinker burned relatively hard. In order, therefore, to take full advantage of my process in seasoning softer burned clinker, the carbon dioxide content of the air is too low to carry out the reaction and another gas must be employed. For this purpose I prefer to take the waste flue gas from the kiln, 10, which is normally of very high carbon dioxide content and is drawn through the conduit, 44, by the fan, 45, which forces the gas into the humidifier, 46, which is employed if the gases are drawn from a "dry kiln", or into a cooler which may be substituted if the gases are drawn from a "wet kiln", and it is necessary to condense a portion of the moisture out of the gas before it is led to the mixing valve, 47, which may or may not be included as a means for diluting the flue gas with air if desired, though ordinarily unnecessary.

The gas is then compressed to the desired pressure, which may vary from 30 to 100 pounds, depending upon the factors mentioned before, by a compressor, 48, which delivers the compressed gas to a reservoir, 49. A pipe line, 50, conducts the gas from the reservoir, and controlled by the usual valves, admits the gas to the port, 41, of the air ring, 36.

Although I have disclosed one form of device for transporting and treating the cement, it is to be understood that various means may be employed to carry out the steps of my process.

I claim as my invention:

1. A process for aging or seasoning cement which consists in delivering ground cement to a conduit, advancing the same in the conduit and subjecting it to constantly increasing pressure to form a zone of densely packed cement, injecting a gas containing carbon dioxide under pressure into the cement in said zone, and transporting the cement through a pipe line in contact with said gas.

2. A process for aging or seasoning cement which consists in delivering the cement to a conduit, advancing the same in the conduit and subjecting it to progressively increasing pressure to form a zone of densely packed cement serving as a seal to resist a backward flow of gas under pressure, injecting a compressed gas containing carbon dioxide into said zone to thoroughly aerate the cement, and transporting the particles of cement through a pipe line in intimate contact with said gas.

3. A process for aging or seasoning cement which consists in continuously supplying freshly ground cement to a short length of conduit and subjecting it to progressively increasing pressure to form a zone of densely packed cement, injecting a gas containing carbon dioxide and moisture into the cement in said zone to thoroughly aerate the cement, and transporting the aerated cement through a pipe line by pressure applying means and the normal expansion of the injected gas, whereby the carbon dioxide and moisture will react upon the free lime to neutralize the same.

4. A process for aging or seasoning cement which consists in continuously supplying the cement to a short length of conduit, subjecting the cement to continuously increasing pressure within the conduit to form a seal of densely packed cement, injecting a gas containing moisture and carbon dioxide into said seal beyond the point of formation of the seal, to aerate the cement, and transporting the cement particles in contact with said gas through a conduit by the pressure supplying means and the normal expansion of the injected gas.

5. A process for aging or seasoning cement which consists in supplying ground cement to a conduit, advancing the same in the conduit and subjecting it to progressively increasing pressure to form a zone of densely packed cement, injecting a gas under pressure into the cement in said zone, the said gas being derived from waste products of combustion and having a relatively high carbon dioxide content, and transporting the cement particles through a pipe line by the resultant of the pressure applying means and the normal expansion of the gas within the pipe line.

6. A process for aging or seasoning cement which consists in continuously supplying ground cement to a short length of conduit, advancing the same within the conduit and subjecting the same to continuously increasing pressure to form a seal of densely packed cement, injecting a mixed gas under pressure into said densely packed cement to aerate the same, the said gas including waste gases of combustion containing moisture and a relatively large amount of carbon dioxide, and transporting the cement particles through a pipe line by the pressure applying means and the normal expansion of the gas in intimate contact with said gas.

7. A process for aging or seasoning cement which consists in supplying ground cement to a short conduit, advancing and compacting the cement within the conduit, injecting a gas into the compacted cement, the said gas being a mixture of air and waste gases of combustion high in carbon dioxide and containing moisture, and transporting the cement through a pipe line by the said advancing and compacting means and the normal expansion of the gas, whereby the moisture and carbon dioxide will react upon the free and uncombined lime within the pipe line.

8. A process for aging or seasoning cement, which comprises introducing the cement continuously into a pipe line at one end thereof and withdrawing it at the other end, the cement being introduced in sufficient quantities to maintain a column of cement throughout the line, subjecting the column of cement in the line to pressure transmitted throughout the column from one end to the other and tending to force the cement through the line, and continuously injecting a seasoning gas under pressure into the column of cement at a point beyond the point of application of the pressure in the direction of movement of the cement, the cement being continuously advanced through the line by the action of the pressure and by the expansion of the gas.

9. A process for aging or seasoning cement, which comprises continuously moving the cement in the form of a column throughout a pipe line from one end to the other, partly by the application of mechanical pressure applied at one point in the line, and continuously injecting a seasoning gas under pressure into the column of cement at a point beyond the point of application of the mechanical pressure in the direction of movement of the cement, the cement being rendered more fluent by the injection of the gas and being continuously advanced through the line by the action of the mechanical pressure and by the expansion of the gas.

10. A process for aging or seasoning cement, which comprises supplying the cement continuously to a pipe line at one end thereof, subjecting the cement in the line to mechanical pressure tending to force it along the line, the pressure being so applied as to cause the cement substantially to fill the line and move through it in the form of a column, and injecting a seasoning gas containing carbon dioxide into the line at a point beyond the point of application of the mechanical pressure, the gas being introduced under pressure such that it enters between the particles of the cement and renders them more fluent, the column of cement being thus continuously advanced through the line by the action of the mechanical pressure and by the expansion of the gas.

In testimony whereof I affix my signature.

JAMES WHEELER FULLER.